DOUBLE QUANTUM PHONON MASER AMPLIFIER

Filed June 1, 1965 2 Sheets-Sheet 1

INVENTOR.
NORMAN S. SHIREN
BY [signature]
ATTORNEY

United States Patent Office 3,289,090
Patented Nov. 29, 1966

3,289,090

DOUBLE QUANTUM PHONON MASER AMPLIFIER

Norman S. Shiren, Mount Kisco, N.Y., assignor to International Business Machines Corporation, Armonk, N.Y., a corporation of New York Filed June 1, 1965, Ser. No. 460,046
6 Claims. (Cl. 330—4)

This invention relates to acoustical amplifiers and more particularly to an amplifier that operates on the principle of stimulated double quantum emission.

The treatment of devices that operate on the principle of double quantum emission is set forth in two articles, one entitled "Some Theoretical Aspects of a Proposed Double Quantum Stimulated Emission Device" authored by P. P. Sorokin and N. Braslau that appeared on pp. 177–181 of the April 1964 issue of the "IBM Journal of Research and Development," vol. 2, and the other entitled "Analysis of a Nondegenerate Two-Photon Giant-Pulse Laser" authored by R. L. Garwin and appearing on pp. 338–340 of the July 1964 issue of the "IBM Journal of Research and Development," vol. 8, No. 3. In the former article, the operation of a two-photon laser is described. Such laser comprises a cavity resonant at frequency $V_A$ and containing ions of type B with an inverted population $N_B/V$ between levels separated by an energy difference $hV_B$ such that $V_B=2V_A$. It is necessary that the system not lase at $V_B$, which criterion can be satisfied by low reflectivity of the cavity at freqquency $V_B$, by strong parasitic absorption in the laser material near frequency $V_B$, or preferably by a choice of ion such that the transition $V_B$ is highly forbidden to a single-quantum process. A priming density of photons of frequency $V_A$ will provoke the simultaneous emission from the inverted population $N_B$ of pairs of photons $V_A$ at a rate exceeding the cavity loss, the process diverging until the population inversion is eliminated.

In the latter article by Garwin, the optical cavity is modified so that instead of having $V_B=2V_A$, the cavity is made resonant at two frequencies $V_A$ and $V_C$ so that $V_A+V_C=V_B$. The cavity is primed at $V_A$ with a number of photons small compared with $N_B$ so that two giant pulses are emitted simultaneously at frequencies $V_A$ and $V_C$.

In both of the prior teachings of Sorokin and Garwin, only electromagnetic radiation was amplified using the process of double quantum emission. However, by employing a host crystal of MgO having $Fe^{2+}$ and $Ni^{2+}$ ions imbedded therein and relying upon a suitable means to invert the $Fe^{2+}$ and $Ni^{2+}$ spin systems in MgO, microwave ultrasonics, at the spin frequency, can be amplified by interaction with such inverted spins.

Consequently it is an object of this invention to obtain an improved acoustical energy amplifier.

It is yet another object to provide an acoustical amplifier that exploits the phenomenon of amplification by stimulated double quantum emission.

Yet another object is to obtain microwave acoustical amplification gains heretofore unattainable in ultrasonic masers.

Another object is to obtain inversion by adiabatic rapid passage utilizing, as the required pump power, the same input as is used to trigger the double quantum process.

The foregoing and other objects, features and advantages of the invention will be apparent from the following more particular description of a preferred embodiment of the invention, as illustrated in the accompanying drawing.

Figure 1:
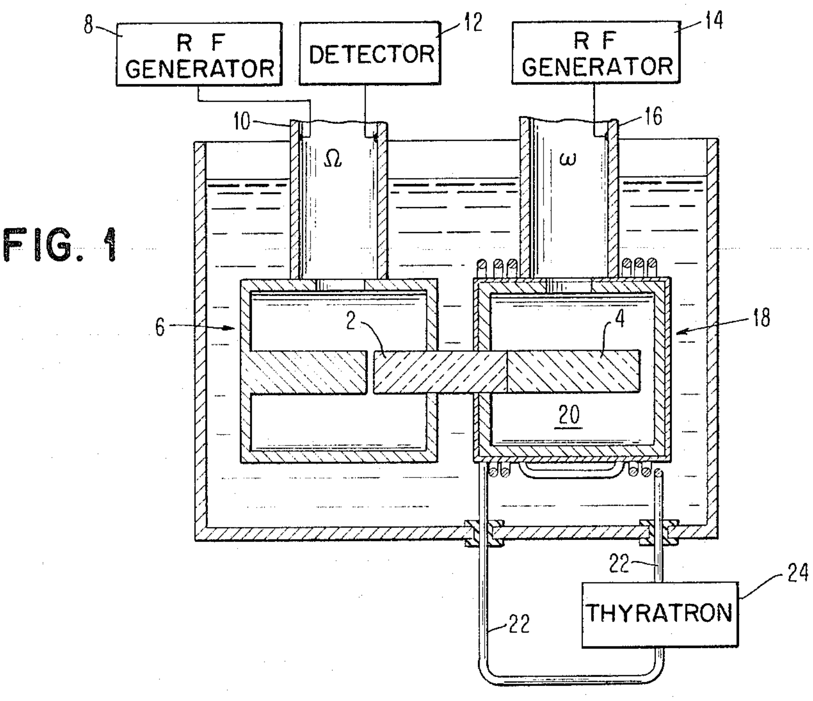
FIG. 1 is a showing of a preferred embodiment of a maser system for carrying out the acoustical amplification noted above.

As seen in FIG. 1, a quartz crystal 2 is bonded by a suitable material, such as a resin or the like, to a crystal 4 of MgO. The MgO crystal 4 is doped with $Fe^{2+}$ ions or $Ni^{2+}$ ions, the latter being selected because they have large spin phonon couplings. $Fe^{2+}$ and $Ni^{2+}$ ions are particularly desirable in the practice of the invention to be described, but the host crystal 4 can be doped with other impurities which possess such large spin phonon couplings; $U^{4+}$ in $CaF_2$ being another example, with $CaF_2$ being the host crystal for the impurity $U^{4+}$. The quartz crystal 2 has its unbonded face placed in a cavity resonator 6 which is a conventional re-entrant resonator used in the generation of microwave ultrasonics. A radio frequency pulse generator 8 applies suitable pulses to wave guide 10 so that the latter can carry such pulses of energy into the resonating cavity 6 where the quartz transducer 2 can convert them into acoustical pulses. Detector 12 is coupled to wave guide 10 and is any conventional means for sensing the electrical field created by an acoustical signal that traverses the MgO crystal, is acted upon by energy fields applied to said crystal, and returns back through quartz transducer 2 into cavity resonator 6.

A radio frequency generator 14 supplies pulses via wave guide 16 into a cavity 18 which comprises a silver-coated ceramic cylinder 20. Copper coils 22 surround the cylinder 20 and current pulses are applied to these coils 22 by a thyratron 24. The foregoing elements set forth a specific means for obtaining population inversion utilizing adiabaic rapid passage. The two cavities 6 and 18 and portions of wave guides 10 and 16 are imbedded in liquid helium so as to maintain the MgO 4 at suitable low temperature.

Figure 2:
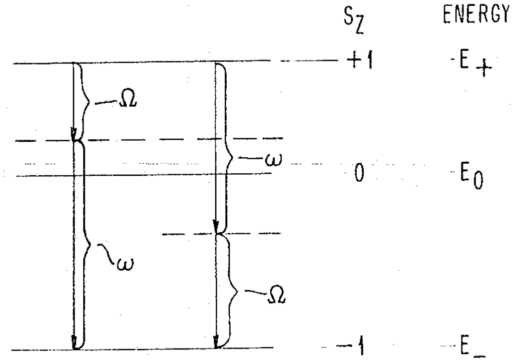
FIG. 2 is an energy-level diagram to be used as an aid in describing the operation of the invention.

In order to explain the operation of the system set forth in FIG. 1, attention is directed to FIG. 2, the latter illustrating a spin ($S=1$) system with three spin ($S_3$) levels 0, $+1$, $-1$ where the energy $E_+$ corresponds to $+1$ spin, $E_0$ is the zero spin state and $E_-$ corresponds to the $-1$ spin level. Assume that the populations of the ions chosen, such as $Fe^{2+}$ or $Ni^{2+}$, have been inverted by suitable pumping energy. Two independent radiation fields are applied to the system such that the relation $$E_+-E_-=2\hbar\gamma H_0$$

exists, and where $\hbar$ is Planck's constant, $\gamma$ is the gyromagnetic ratio and $H_0$ is an applied D.C. magnetic field. One radiation field has a frequency $\omega$ and the other a frequency $\Omega$. For the present invention, $\omega$ is an electromagnetic field and $\Omega$ is an acoustic field for that aspect of the invention which utilizes adiabatic rapid passage to obtain inversion. The electromagnetic field at frequency $\omega$ is made very strong and the acoustic signal at frequency $\Omega$ is weak.

In accordance with the teaching set forth, particularly in the Garwin article cited hereinabove, the fields Ω and ω can stimulate simultaneous emission of two quanta for every transition from +1 to −1 state, one quantum of energy emitting at frequency ω and the other quantum at frequency Ω, such that $$\omega+\Omega=\frac{E_+-E_-}{\hbar} \text{ and } \Omega\neq\omega$$

Figure 3:
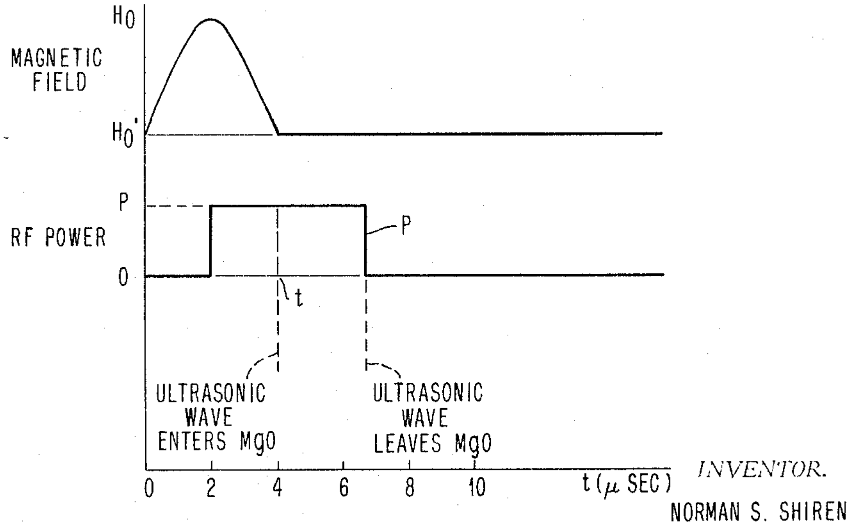
FIG. 3 is a plot of a magnetic field and a radio frequency field versus time employed in the invention embodied in FIG. 1.

The actual means for attaining an amplification of a weak acoustical signal is better illustrated by examining FIGS. 1 and 3. In order to obtain a pulsed acoustical maser using the principle of double quantum emission, (1) the ion population must be inverted and (2) a strong R.F. field is required. To attain population inversion, the technique of adiabatic fast passage is relied upon. A more comprehensive treatment of such technique is given in a text entitled "The Principles of Nuclear Magnetism" by A. Abragam, published in 1961 by the Oxford Press in England, the description beginning on page 34 of such text. It is sufficient, for explaining the technique of adiabatic fast passage as it is employed in the present invention, to note that the method of adiabatic fast passage requires sweeping a magnetic field H such that the resonant frequencies of the transitions, $E_0-E_-$ and $E_+-E_0$ pass through the frequency ω, at which frequency there is a strong R.F. magnetic field in cavity 18. This latter strong R.F. field is also used for triggering the desired double quantum transition in the presence of the acoustic wave at frequency Ω. The particular embodiment shown in FIG. 1 permits the R.F. field generated by 14 to play this dual role.

In order to operate the acoustical maser amplifier, generator 14 is actuated so as to generate a relatively strong R.F. square-wave signal pulse P shown in FIG. 3, the latter pulse is applied to the cavity 18 during the presence of the four microsecond sweep pulse, the latter being initiated by a current pulse from thyratron 24 that passes through coils 22, such current through coils 22 creating the magnetic field that varies between $H_0'$ and $H_0$. Generator 8 is timed to emit a radio frequency signal at frequency Ω so that such signal impinges upon quartz 2 to be converted itno an acoustical signal that enters the MgO 4 at the time when the sweep field H terminates. The R.F. signal pulse P is not turned off until the ultrasonic wave is reflected by MgO 4 back towards quartz transducer 2 and has already entered the latter. The detector 12 is employed to measure the amount of amplification of the original acoustical signal that entered the quartz crystal 2. $H_0'$ is the steady state field at which the double quantum resonance is observed and $\Omega+\omega=2\gamma H_0'$. When the frequencies are chosen so that $\Omega>\omega$, the field sweep $H_0'-H_0$ is negative and is positive, as shown in FIG. 3, when $\Omega<\omega$. The total sweep time is about 2 μsec. and the R.F. pulse P is 5 μsec., permitting 3 μsec. for the ultrasonic signal to enter and leave MgO crystal 4.

The novel system described above can be used as a triggerable amplifier, the strong R.F. field at frequency ω supplying the triggering energy. The process for obtaining acoustical amplification by double quantum transitions is also tunable in two ways, (1) by varying $H_0$ and keeping ω fixed, Ω is thereby varied according to $\Omega=2\gamma H_0'-\omega$ or (2) keeping $H_0'$ fixed and varying ω so that Ω varies according to the same formula. Moreover, it is not required in practicing the invention that one signal be acoustical in nature and the other be electromagnetic. Two signals at frequency $\Omega_1$, and $\Omega_2$ can be acoustical. Assume that population inversion has been obtained by any suitable means. Then a high power acoustic wave at $\Omega_1$ can trigger the double quantum transitions so as to amplify another, low power, acoustic wave at a frequency $\Omega_2$ such that $\Omega_1+\Omega_2=\gamma H_0'$. Yet, in another manner, two low power acoustic waves at $\Omega_1$ and $\Omega_2$ may simultaneously stimulate double quantum emission and both be amplified.

Figure 4:
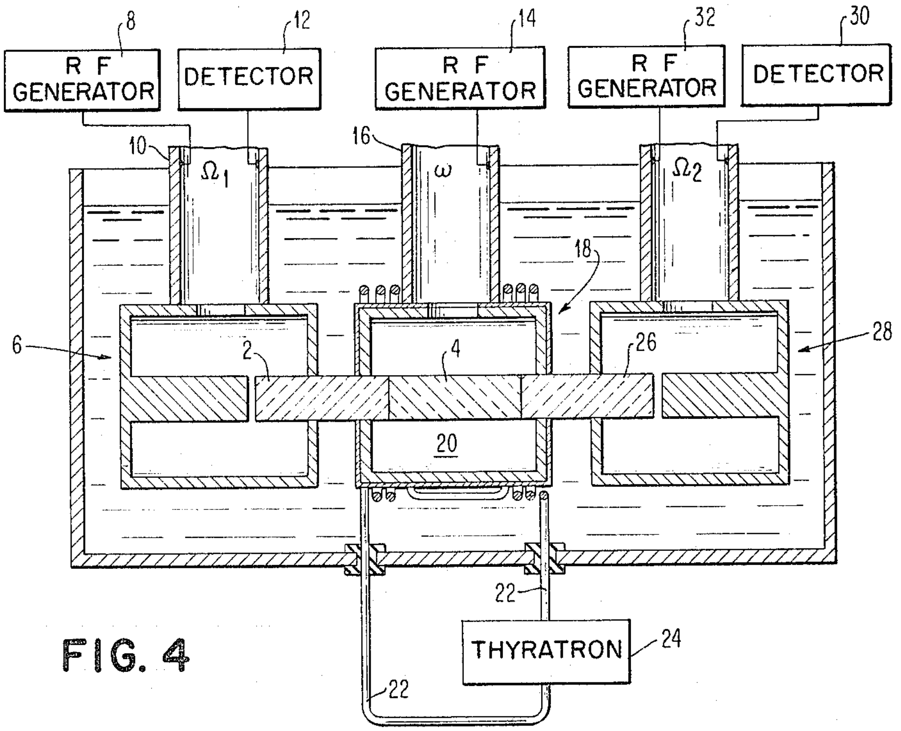
FIG. 4 is a modification of the embodiment shown in FIG. 1.

A suitable embodiment for this purpose is shown in FIG. 4 Adiabatic rapid passage is again used for population inversion as in FIG. 1. But an additional acoustic wave is generated in quartz transducer 26 when an R.F. signal pulse from generator 32 enters cavity 28. In this embodiment, the R.F. power pulse at frequency ω is turned off at time *t* (FIG. 3) when the ultrasonic signals $\Omega_1$ and $\Omega_2$ enter the MgO crystal 4 respectively from the left and right of said crystal. Detectors 12 and 30 detect the respective amplified acoustical waves $\Omega_1$ and $\Omega_2$. Thus two acoustical signals can be amplified by one process of stimulated double quantum emission.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A wave amplifier comprising a transducer capable of converting electromagnetic energy into acoustical energy at a desired frequency Ω,
   an acoustic propagating medium coupled to said transducer,
   ions having a large spin phonon coupling imbedded in said propagating medium,
   means for inverting the population of said ions,
   a second source of energy, greater than said first source of energy, and having a frequency ω,
   means for obtaining a resonant frequency of said ions to be equal to ω+Ω whereby the introduction of said stronger source of energy into the propagating medium triggers a double quantum stimulation emission, one at the frequency of Ω and the other at the frequency ω.

2. The wave amplifier of claim 1 wherein the energy at frequency ω is electromagnetic.

3. The wave amplifier of claim 1 wherein the energy at frequency ω is acoustical.

4. A wave amplifier comprising a transducer capable of converting electromagnetic energy into acoustical energy at a desired frequency Ω,
   an acoustic propagating medium coupled to said transducer,
   ions having a large spin phonon coupling imbedded in said propagating medium,
   means for inverting the population of said ions by the process of adiabatic rapid passage utilizing electromagnetic energy at a frequency ω and a sweeping D.C. magnetic field so the resonant frequency of said ions is equal to ω+Ω,
   and means for continuing the utilization of said electromagnetic energy at said frequency ω when said D.C. magnetic sweep field has terminated whereby said electromagnetic energy at frequency ω triggers double quantum emission to cause amplification of said acoustical energy having the frequency Ω.

5. A wave amplifier comprising means for generating an acoustical signal pulse having a frequency Ω,
   an acoustic propagating medium coupled to said transducer,
   ions having a large spin phonon coupling incorporated in said propagating medium,
   means for employing the method of adiabatic fast passage to invert the populations of said ions in said propagating medium, the R.F. field employed in said adiabatic fast passage method providing a frequency ω, the sum of said frequencies Ω and ω being equal to the resonant frequency of said inverted ion population.

6. A wave amplifier comprising means for generating a first acoustic signal pulse having a frequency $\Omega_1$,
   means for generating a second acoustic signal pulse having a frequency $\Omega_2$, an acoustic propagating medium coupled to both generating means so as to receive said signals, ions having a large spin phonon coupling incorporated in said propagating medium, means for inverting the population of said ions in said propagating medium whereby the resonant frequency of said inverted ion population is equal to $\Omega_1+\Omega_2$, and means for employing the signal pulse of frequency $\Omega_1$ for triggering double quantum emission to cause amplification of each of said frequencies at $\Omega_1$ and $\Omega_2$.

No references cited.

ROY LAKE, *Primary Examiner.*

D. R. HOSTETTER, *Assistant Examiner.*